United States Patent [19]

Porter

[11] Patent Number: 5,287,934
[45] Date of Patent: Feb. 22, 1994

[54] SOIL WORKING IMPLEMENT

[76] Inventor: Brian Porter, 653 Fisher Street, Hemmingford, Quebec, Canada, J0L 1H0

[21] Appl. No.: 278,749

[22] Filed: Dec. 2, 1988

[51] Int. Cl.⁵ .................. A01B 33/02; A01B 33/16
[52] U.S. Cl. .................... 172/123; 172/125; 172/78; 172/120; 172/609
[58] Field of Search .............. 172/21, 35, 39, 78, 172/118, 120, 123, 125, 413, 606, 609, 610, 734, 740

[56] References Cited

U.S. PATENT DOCUMENTS

| | | | |
|---|---|---|---|
| 474,763 | 5/1892 | Schauman | 172/39 X |
| 1,576,862 | 3/1926 | Snow | 172/120 X |
| 2,527,974 | 10/1950 | Tostenrud et al. | 172/78 X |
| 3,120,279 | 2/1964 | Horowitz | 172/42 |
| 3,128,729 | 4/1964 | Henson | 172/549 X |
| 3,783,952 | 1/1974 | Van Gemert | 172/123 X |
| 3,954,143 | 5/1976 | van der Lely | 172/123 X |
| 4,290,488 | 9/1981 | Pelsy | 172/123 |
| 4,421,177 | 12/1983 | Schlapman et al. | 172/125 X |
| 4,512,414 | 4/1985 | Kuhn et al. | 172/125 X |
| 4,545,438 | 10/1985 | Giovanni | 172/123 |
| 4,838,358 | 6/1989 | Freudendahl | 172/125 |

FOREIGN PATENT DOCUMENTS

| | | | |
|---|---|---|---|
| 1011803 | 12/1965 | United Kingdom | 172/39 |
| 1433396 | 4/1976 | United Kingdom | 172/118 |

Primary Examiner—Dennis L. Taylor
Assistant Examiner—Spencer Warnick
Attorney, Agent, or Firm—Robic

[57] ABSTRACT

There is disclosed a plow constructed for displacement, by a traction vehicle, a predetermined direction. It comprises a cultivator having a generally U-shaped frame with a pair of lateral arms parallel to the above direction and interconnected by a bight. The cultivator further has a soil-chiselling assembly mounted on and transversely between the arms, this assembly including a horizontal rotary shaft provided with longitudinally spaced sets of coplanar flat radial shares. The cultivator is mounted on retractable wheels movable between the first position, wherein the wheels engage the soil for displacement of said cultivator with the soil-chiselling assembly stands inoperative above the soil, and a second position, wherein the wheels are retracted and stand above the soil and the soil-chiselling assembly operatively engages the soil. Finally, the plow has a soil-lump breaker which is mounted on the free ends of the lateral arms of the cultivator frame and which includes lump-breaking elements disposed between the spaced sets of shares.

18 Claims, 14 Drawing Sheets

SOIL WORKING IMPLEMENT

BACKGROUND OF THE INVENTION

1. Field of the Invention

The present invention relates to improvements in a plow of the type having a rotary shaft on which are mounted spaced sets of radial shares for tilling the soil.

More particularly, the invention relates to a plow having a rotary shaft on which are mounted spaced-apart sets of coplanar flat radial shares for use in "chiselling" the soil.

In the following description and claims, the word "chiselling" is intended to designate the kind of soil lifting and soil loosening that are obtained when the flat radial shares of the plow are rotating.

2. Description of the Prior Art

U.S. Pat. No. 4,545,438 discloses a plow of the above mentioned type, whose original characteristic lies mainly in the particular configuration of the blades mounted in spaced sets on a horizontal shaft to till the soil (i.e. to lift it up and turn it over as the shares leave the ground). The plow, intended to be drawn by a traction vehicle, has no wheels for use where it has to be displaced on roads. It only has a wide and heavy roller acting as a support, as well as serving to break soil lumps, which roller is located behind the shares. This roller is quite unsuitable for riding on firm grounds such as on roads. Additionally, the roller restricts seriously the possibility of making full effective use of the tilling blades because both the shaft and the roller are mounted on the same solid frame with no possible adjustment of their relative positions.

A main object of the invention lies in providing an improved rotary plow which on the one hand, has chiselling shares instead of tilling shares and which, on the other hand, avoids the above difficulties.

Other patents of less interest, known to Applicant, are U.S. Pat. Nos. 3,120,279 and 4,290,488.

SUMMARY OF THE INVENTION

Broadly, the invention is a plow constructed for displacement along a predetermined direction, which plow comprises a cultivator having a generally U-shaped frame with a pair of lateral arms parallel to the above direction and interconnected by a bight. The cultivator further has a soil-chiselling assembly mounted on and transversely between the arms, this assembly including a horizontal rotary shaft provided with longitudinally spaced-apart sets of coplanar flat radial shares. The cultivator is mounted on retractable wheels movable and adjustable between a first position wherein the wheels engage the soil for displacement of said cultivator and the soil-chiselling assembly stands inoperative above the soil, and a second position, wherein the wheels are fully retracted and stand above the soil and the soil-chiselling assembly is deeply engaged in the soil. Of course any adjustement of the wheels between these first and second position makes it possible to control the depth of engagement of the assembly in the soil. Finally, the plow has a soil-lump breaker which is mounted on the free ends of the lateral arms of the cultivator frame and which includes lump-breaking elements disposed between the spaced sets of flat shares.

According to a preferred embodiment of the invention, the lump breaker comprises a generally U-shaped frame having a transverse support and lateral legs, the lump-breaking elements being mounted on the support and extending in the predetermined direction mentioned above toward the soil-chiselling assembly. The plow further comprises means mounting the free ends of the legs on the free ends of the lateral arms of the cultivator frame for pivoted movement of the lump breaker about an axis which is transverse to the above-mentioned predetermined direction, and other means for adjusting the angular position of the lump breaker frame relative to the cultivator frame.

In one particular form, the means mounting each wheel on the cultivator frame comprise a bar having one end pivoted to the bight of the cultivator frame for pivoted movement about an axis perpendicular to the direction of displacement of the plow while the wheel is mounted for free rotation at the other end. A power jack connected to both the bar, near the wheel, and the bight allows the wheel to be retracted in the frame and moved out of it for use when the plow has to be displaced on a road.

In another particular form, the two bars are coaxial and solid with the two legs of the lump breaker frame at the legs' pivoted ends so as to form with them a pair of upwardly open bell-crank levers; the wheels being mounted for free rotation at the free ends of the bars, respectively. In this case, the power jacks are connected, respectively, to the bars adjacent to the wheels and to the free ends of the lateral arms of the cultivator frame.

Other features and advantages of the invention will become apparent from the description that follows, of preferred embodiments having reference to the appended drawings.

DESCRIPTION OF THE PREFERRED EMBODIMENTS

Figure 1:
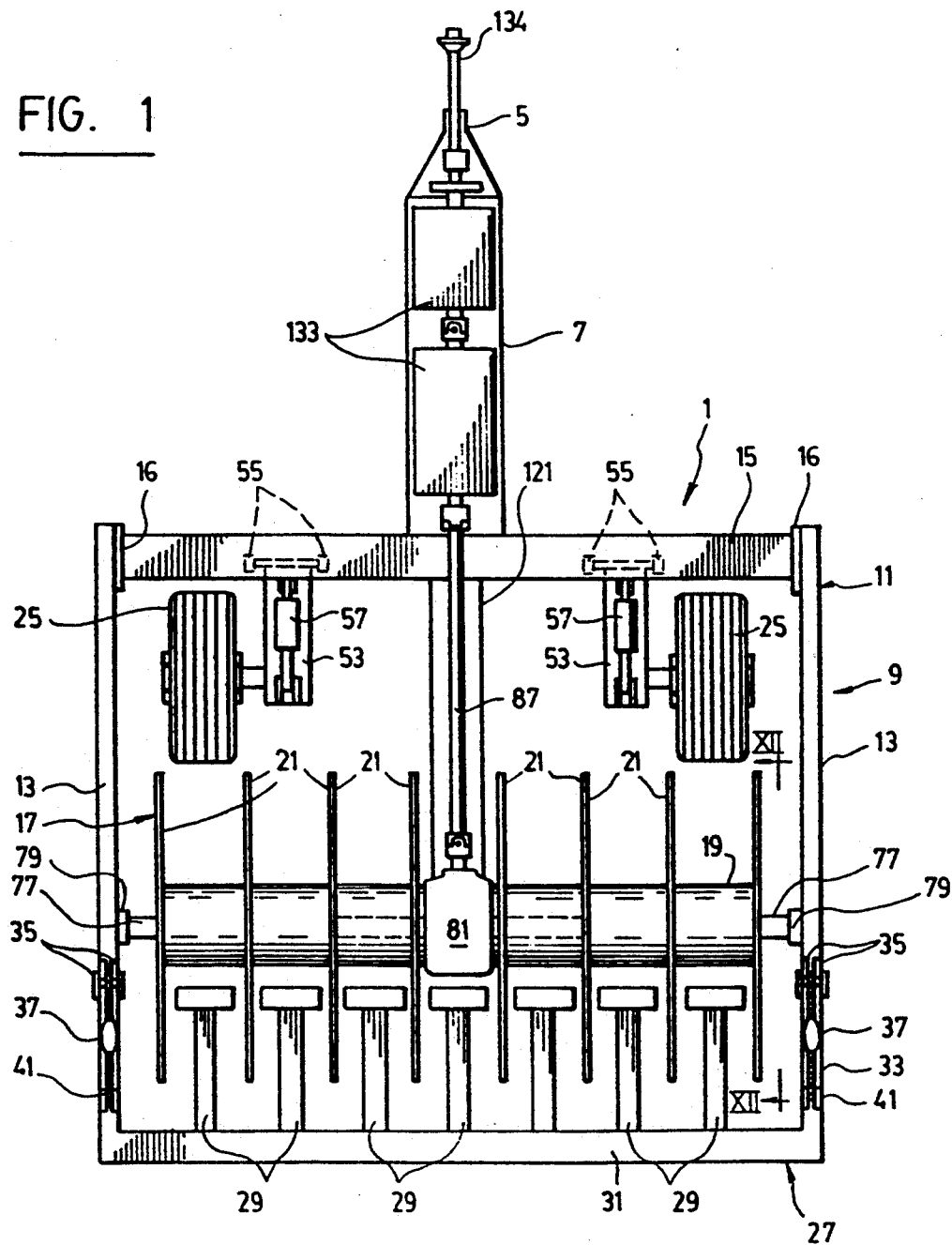
FIG. 1 is a diagrammatic top plan view of a rotary plow according to a first embodiment of the invention.
Figure 2:
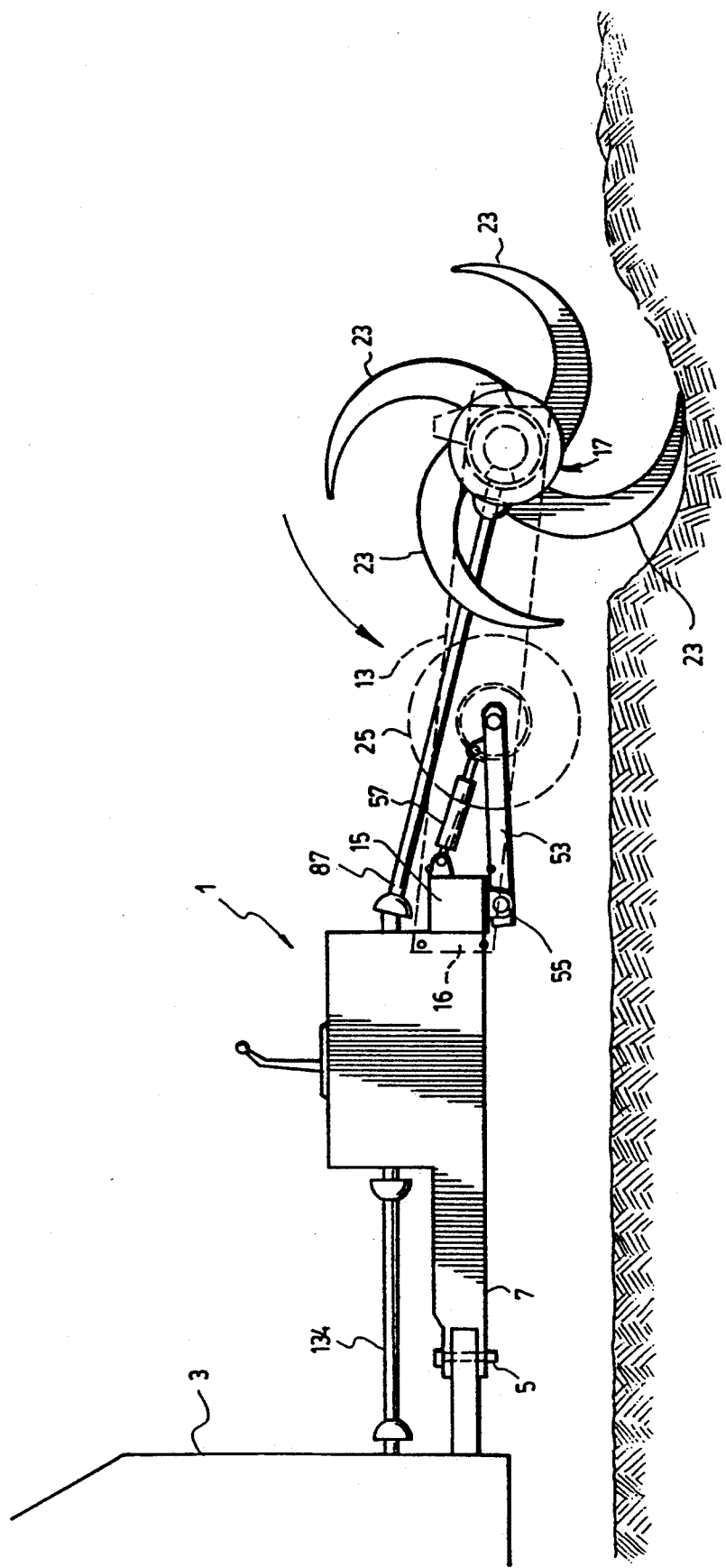
FIG. 2 is a diagrammatic side elevation of the plough of FIG. 1, with the lump breaker disconnected.
Figure 3:
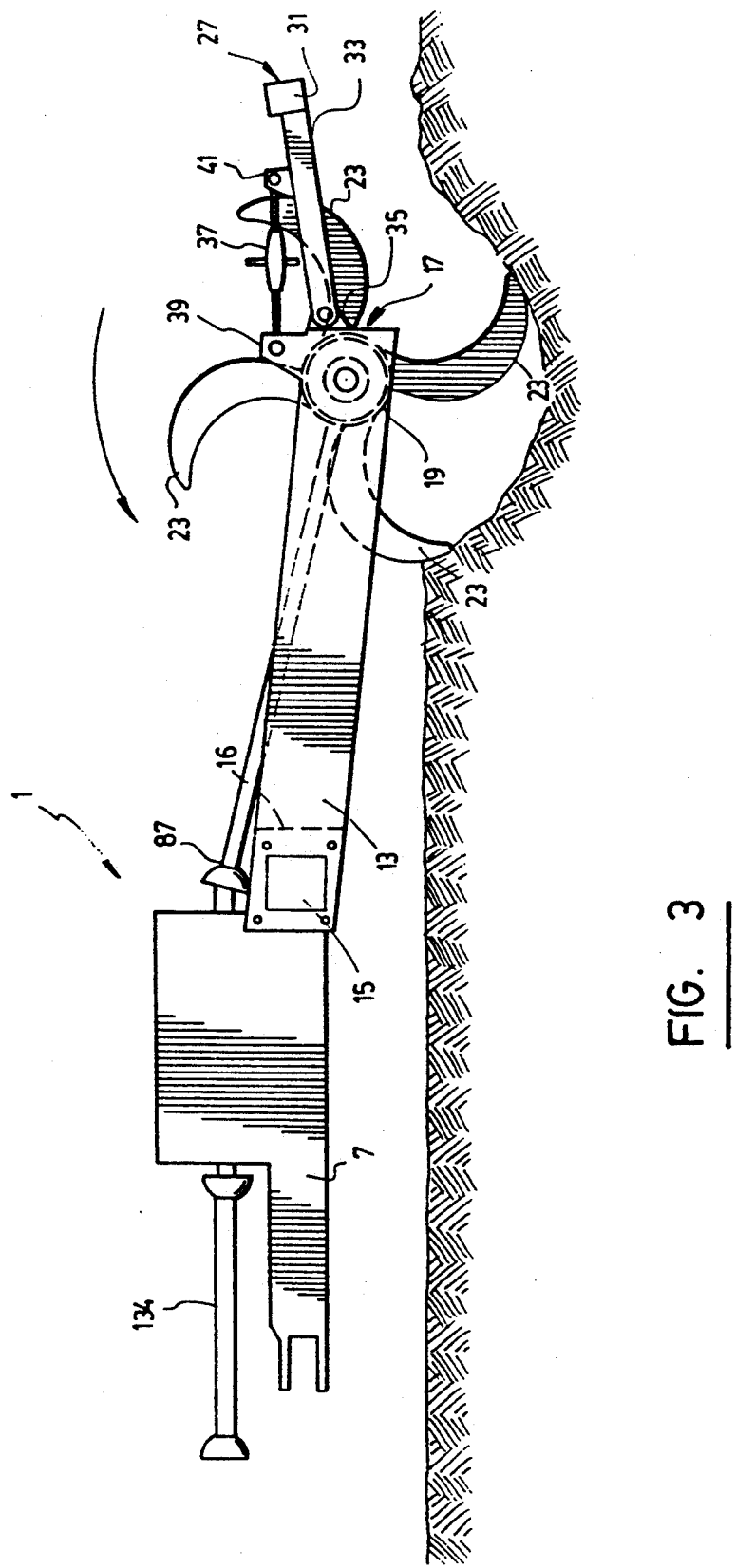
FIG. 3 is a view similar to that of FIG. 2, including the lump breaker.

Referring to FIGS. 1, 2 and 3, there is shown a rotary plow 1 to be hooked to a tractor or other traction vehicle 3 (FIG. 2) by means of a hitch device 5 at the end of a draw bar construction 7.

The plow 1 comprises a cultivator 9 having a generally U-shaped frame 11, with a pair of lateral arms 13, extending parallel to the direction of displacement of the plow and interconnected at one end by a transversed bight 15. For ease in maintenance work, the ends of the bight 15 have terminal connection plates 16 secured, by bolts, to the inner ends of the lateral arms 13. The cultivator 9 further has a soil-chiselling assembly or rotor 17 mounted for rotation on and between the two lateral arms 13 at their free ends. The rotor assembly 17 includes a horizontal rotary shaft 19 provided with longitudinally spaced-apart sets 21 of radial coplanar shares 23 in the form of flat curved blades having replaceable chiselling tools (not shown) at their free ends.

The cultivator 9 has a wheel train located between the frame bight 15 and the soil-chiselling assembly or rotor 17. Its wheels 25 are mounted on the frame 11 for movement between a first position where they engage the soil and where the rotor 17 is inoperative and removed above the soil, and a second position which is that of FIGS. 2 and 3, where the wheels 25 are retracted above the soil and the rotor engages and chisels the soil as a plurality of pick-axes would do.

The plow 1 further comprises, on the other side of the rotor 17, a breaker 27 for breaking soil lumps formed between the sets 21 of blades 23. This lump breaker is mounted on the free ends of the cultivator lateral arms 13 and includes lump-breaking elements 29 disposed between the spaced sets of blades.

As shown, the lump breaker 27 is also shaped as a U, having a transverse support 31 for the breaking elements 29 and lateral legs 33 of which the free ends are mounted, by means of bracket plates 35, on the free ends of the lateral arms 13 of the cultivator frame 11, for pivotal movement of the lump breaker 27 about a transverse axis. Adjustment of the angular position of the lump breaker 27 with respect to the cultivator frame 11 is by means of turnbuckles 37 of which the ends, as shown in FIG. 3, are connected, respectively, to brackets 39 of the lateral arms 13 and brackets 41 of the lateral legs 33.

As shown in FIGS. 13 to 16, the lump-breaking elements 29 may take various forms.

Figure 13:
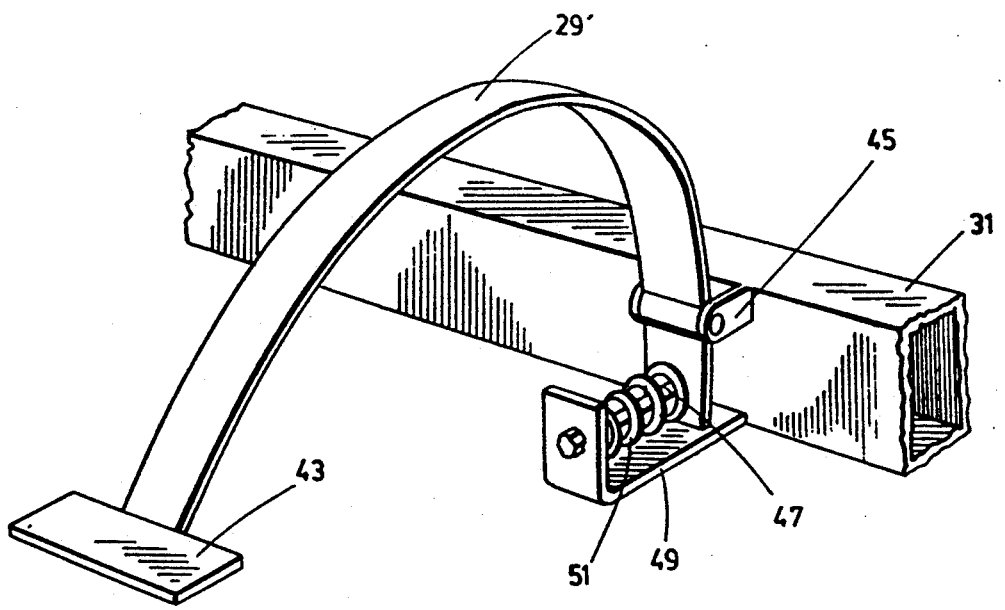
FIG. 13 is a perspective view of one form of one soil lump-breaking element.
Figure 14:
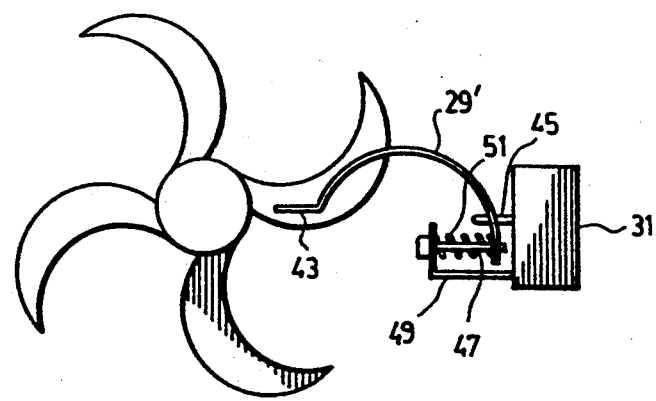
FIGS. 14, 15 and 16 are side views of other forms of elements.

In FIGS. 13 and 14, each lump-breaking element 29' is an upwardly curved stiff metal blade of which one end is resiliently pressed toward the support 31 and of which the other end has a flat horizontal cross-foot extending on either side of the blade 29'. More specifically, the blade's one end is passed loosely across a brace 45 for holding the blade 29' upright and a pin 47 is slid through a hole at is lower end; this pin being secured to the vertical branch of an angular bracket 49 and a spring 51 wound around it with its ends being applied respectively against the bracket vertical branch and the lower end of the blade 29'. It is to be understood that the rotor chiselling blades 23 rotate counterclockwise so that the soil lumps move upward causing the lump-breaking elements 29' to move up also, which movement is resisted by the springs 51.

Figure 15:
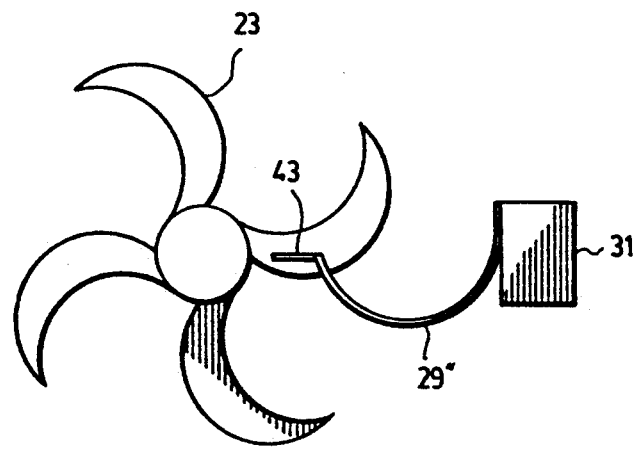

In the variant of FIG. 15, the blade 29" is downwardly curved and is made of resilient material; it has one end secured to support 31, as shown.

Figure 16:
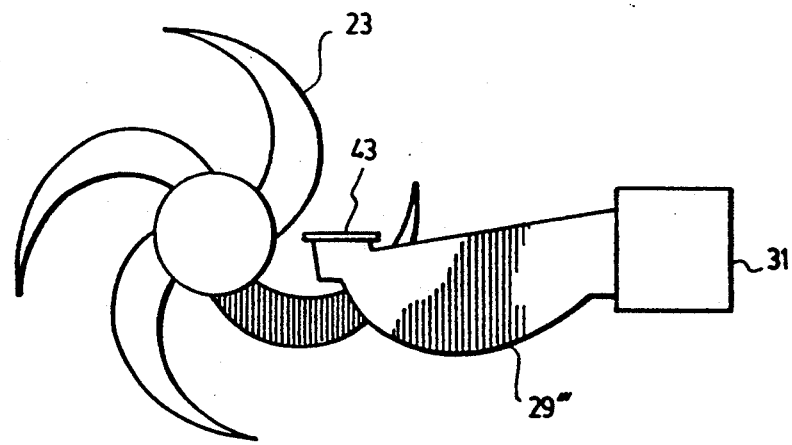

As to the variant of FIG. 16, the lump breaking element is a vertical plate 29'" of which one end is edgedly secured to the support 31.

Returning to the embodiment of FIGS. 1 and 2 the wheel mounting means are constituted, for each wheel 25, by a bar 53 at one end of which the wheel is mounted for free rotation while its other end is pivoted to a pair of brackets 55, beneath the bight 15, for pivotal movement of the bar and wheel about an axis which is perpendicular to the direction of displacement of the plow 1. The pivotal movement is obtained by means of a hydraulic power jack 57 connected to the bar 53, adjacent to the wheel, and connected to the bight 15. The power jacks 57 are mechanically connected as is known, to ensure movement of the wheels 25 in unison.

In this embodiment of the invention, as will be noted, the wheel train operates independently of the lump breaker 27.

Figure 6:
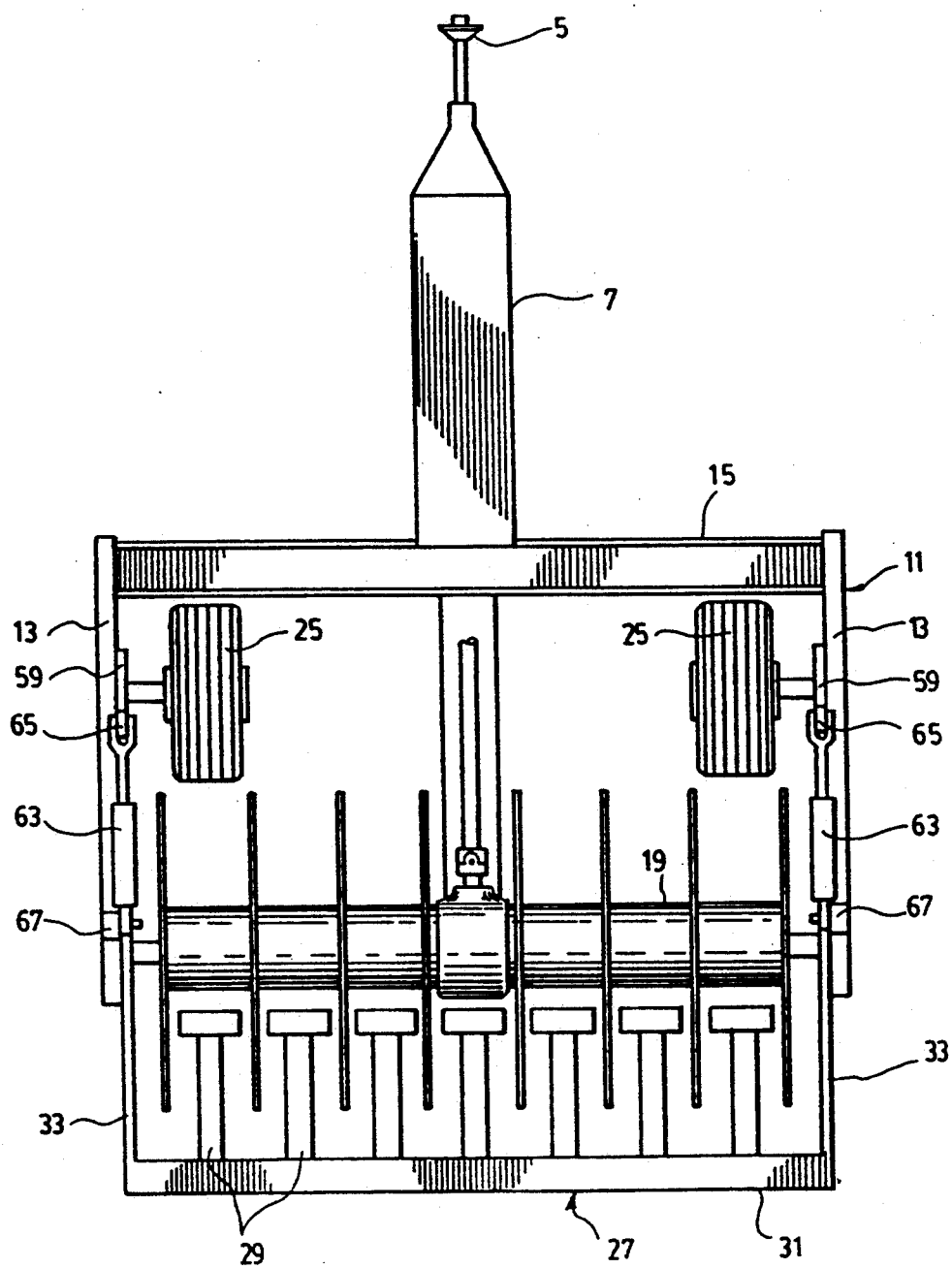
FIG. 6 is a diagrammatic top plan view of a rotary plough according to the second embodiment of the invention.
Figure 7:
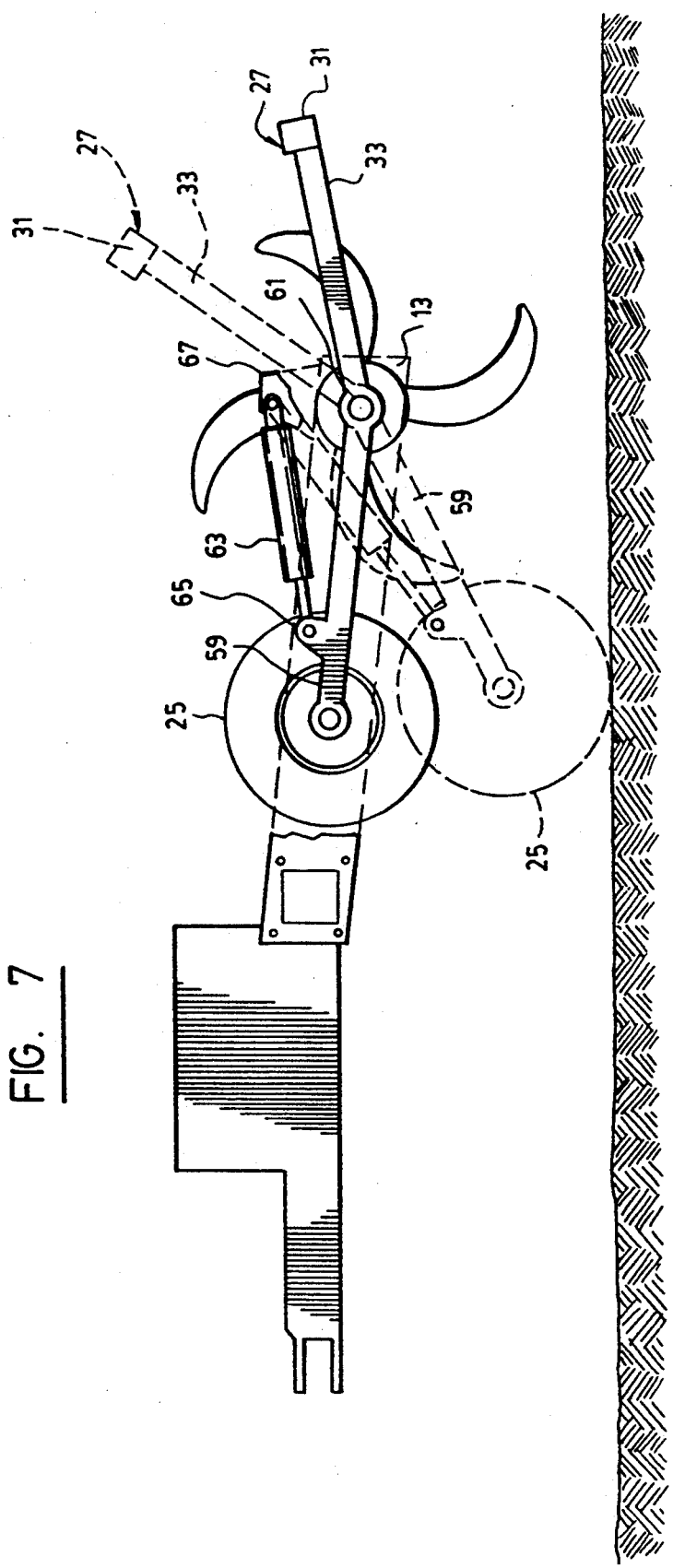
FIG. 7 is a diagrammatic side elevation view of the retractable wheels and lump breaker combination according to the second embodiment of FIG. 6.

According to a second embodiment of the invention, the wheel train and lump breaker are joined solidly together and reference is now made to FIGS. 6 and 7 for the description that follows, in this respect.

In this embodiment, the wheel-mounting means comprise a pair of bars 59 coplanar and solid with the respective lateral legs 33 of the lump breaker 27; the bars 59 and legs 33 forming together upwardly open bell-crank levers, as best seen in FIG. 7, pivoted at their apex 61 to the free ends of the lateral arms 13 of the cultivator frame 11. The wheels 25 are mounted for free rotation at the free ends of the bars 59. It will be appreciated that the apices 61 correspond here to the pivoted ends of the lateral legs 33 in the first embodiment. Pivotal movement of the two wheels 25 of the gear train between the retracted and active positions, and consequently pivotal movement of the lump breaker 27, is obtained by means of power jacks 63 respectively connected to brackets 65 of the bars 57, near the wheels 25, and to brackets 67 at the free ends of the lateral arms 13. Again, operation of the jacks 63 is synchronized to ensure unison motion of the wheels of the gear train 25, 59.

Figure 4:
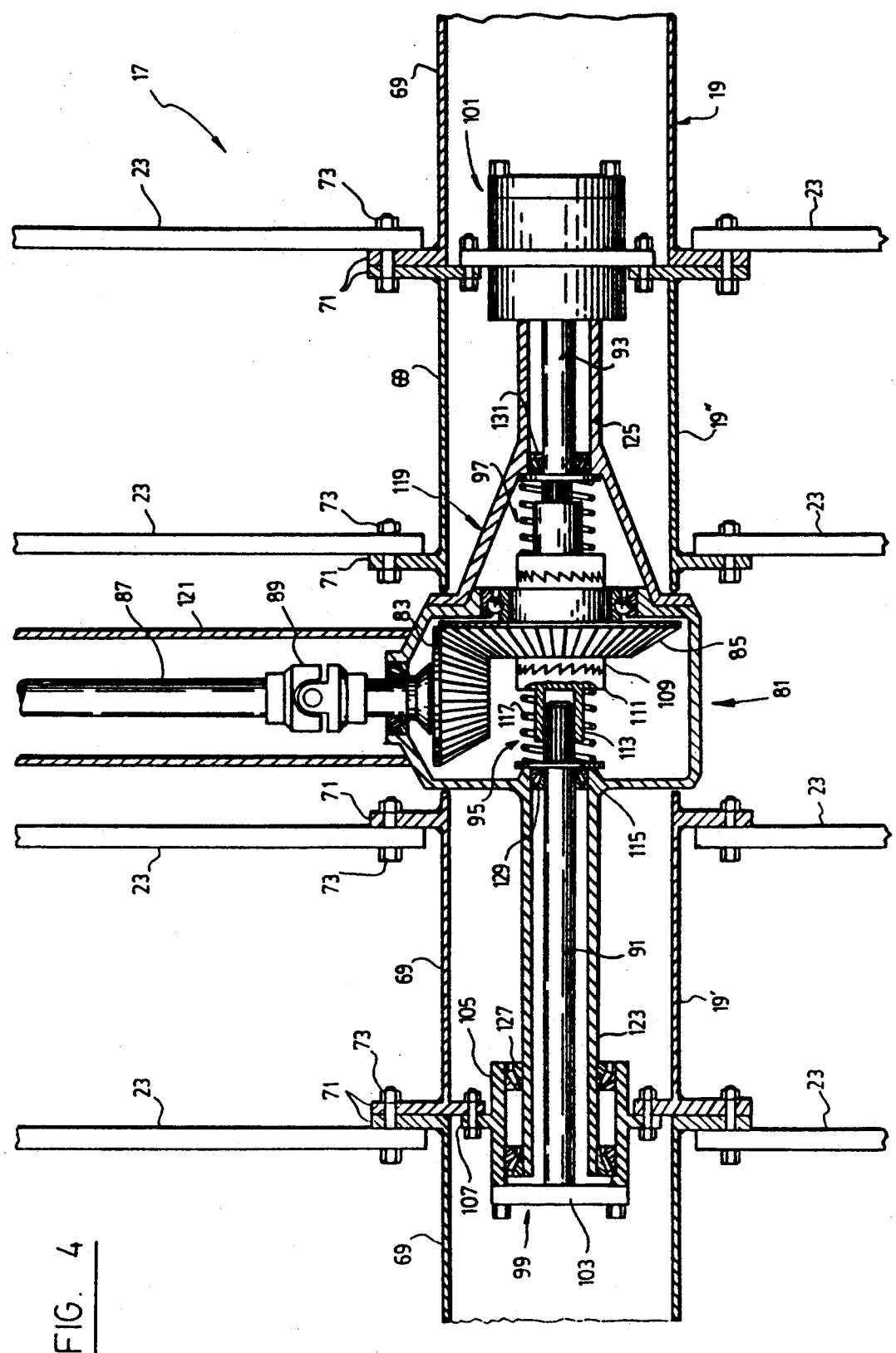
FIG. 4 is a diagrammatic cross-sectional view, on an enlarged scale, of the central portion of the soil-chiselling assembly.
Figure 5:
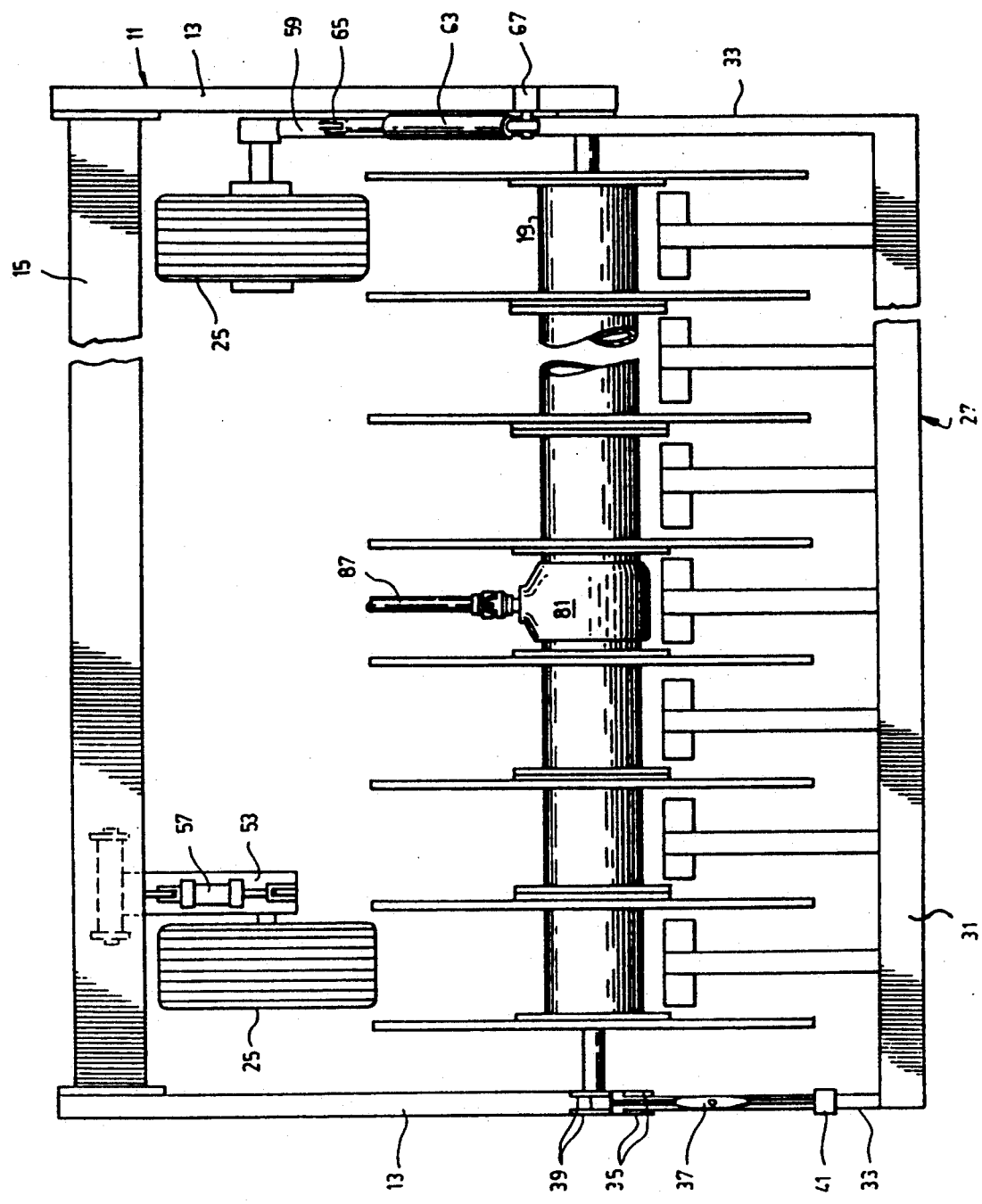
FIG. 5 is a view similar to that of FIG. 1 but showing, on the rightward side and for purposes of comparison, a plough according to a second embodiment of the invention.
Figure 12:
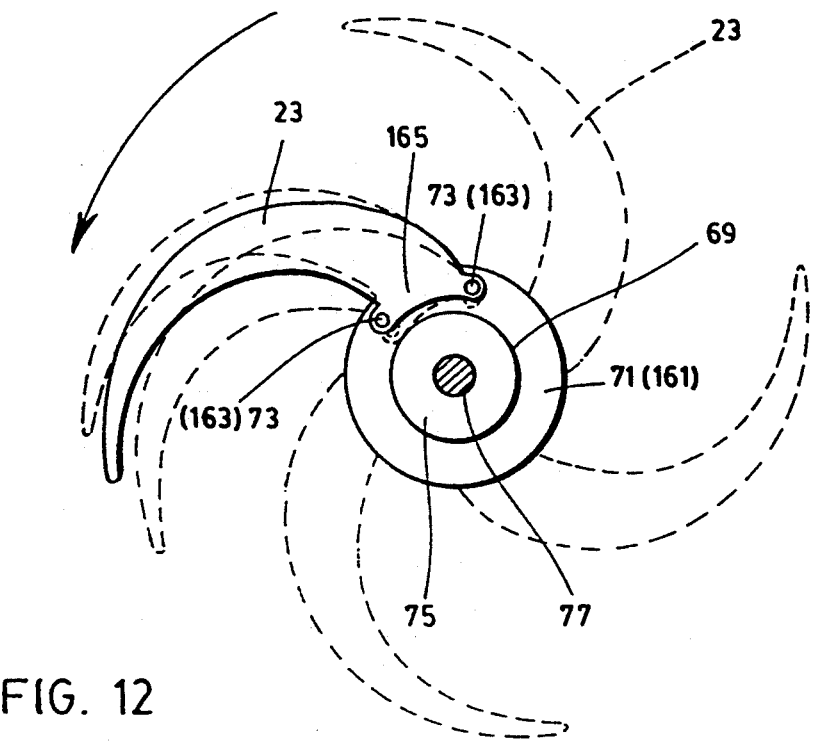
FIG. 12 is a partial cross-sectional view taken along line XII—XII of FIG. 1.

Referring now to FIG. 4, the soil-chiselling assembly 17 comprises a plurality of horizontally disposed coaxial cylindrical sleeves 69 having radial collars 71 at their ends that are releasably connected together end-to-end by bolts and nuts 73 to form the aforesaid shaft 19 as a hollow shaft. The bolts and nuts 73 also serve to removably secure the chiselling blades 23 to and circumferentially around the hollow shaft so that the blades project radially and in sets of coplanar blades spaced longitudinally of the shaft. As illustrated in FIGS. 1 and 12, the ends of the hollow shaft 19 are closed by plates 75 from the center of which stub shafts 77 axially project that freely rotate in bearings 79 of the lateral arms 13 of the cultivator frame 11.

In FIG. 4, the shaft 19 is made up of two shaft sections 19', 19", axially separated from one another to allow for the insertion of a gear transmission 81 having an input gear 83 in mesh with an output gear 85; which transmission is part of the driving means which rotate the shaft 19. The latter means further comprise: a driving shaft 87 connected to the input gear 83 through a universal joint 89; a pair of driven shafts 91, 93 each of which located within one of the hollow shaft sections 19', 19", on either side of the output gear 85; slip clutches 95, 97, connecting one end of the driven shafts 91, 93, to the output gear 85; and driving structures 99, 101, securing hollow shaft sections 19', 19", whereby to drive the shaft 19 into rotation.

The driving structure 99 has a terminal plate 103 secured to the free end of the shaft 91 and bolted to a tube 105 having a central outer radial shoulder 107 bolted to an inner extension of a collar 71 of one of the hollow shaft sleeves 69. The other driving structure 101 is of like construction. Thus, whenever the shafts 91 and 93 rotate, they in turn cause rotation of the sections 19', 19", of the hollow shaft 19.

The slip clutch 95 has an inner part 109 solid with the outer gear 85 and an outer part 111 meshing with the inner part 109 through a slip gearing. A blind tube 113 extends axially from the clutch outer part 111 and connects with the adjacent end of the driven shaft 91 through a spline connection. Solid with the end of the shaft 91 is a radial flange 115 receving one end of a strong spring 117 of which the other end is forceably applied against a shoulder formed between the clutch outer part 111 and its tubular extension 113. The slip clutch 97 and its connection with the other driven shaft 93 are of like construction. The above arrangement is for clockwise rotation of the drive shaft 87 and for counterclockwise rotation of the clutch inner part 109, causing counterclockwise rotation of the chiselling blades 23, as illustrated in FIGS. 2 and 3. Under normal condition of torque transmission and with the illustrated particular characteristic of the slip gearing between the parts 109, 111, firmly held in meshing condition by the strong springs 117, the slip clutches 95, 97 transmit power to the driven shafts 91, 93 and allow one of sections 19', 19" to rotate faster than the other driven by the shaft, as may occur on a turn.

The stationary gear case 119 of the gear transmission 81 is held fast with the bight 15 of the cultivatora 11 by a body 121 enclosing the driving shaft 87. The tubular extensions 123. 125, enclosing the driven shafts 91. 93, support the driving structures 99, 101 (and thus the shaft sections 19', 19") through suitable roller bearing 127. The driven shafts 91, 93, are similarly held by the tubular extensions 123, 125, at their other ends by roller bearings 129, 131. Finally, the driving shaft 87 is connected to a compound gear-train 133 capable of providing different speeds. The gear train 133 is of course coupled to the power take-off 133 of the vehicle.

Figure 8:
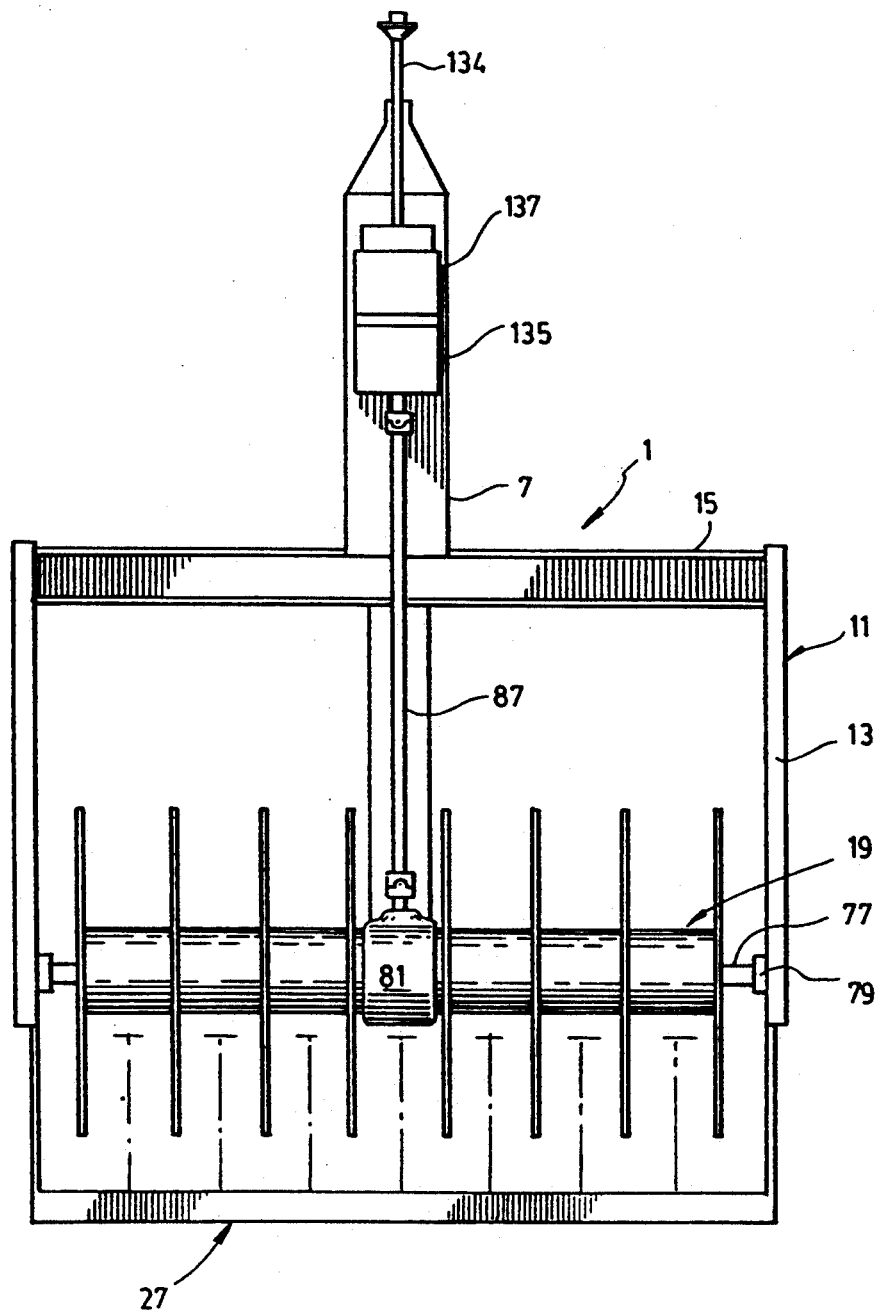
FIG. 8 is a diagrammatic top plan view of a first form of drive mechanism for the rotary cultivator.

Alternatively, and with reference to FIG. 8, the driving shaft 87 may be connected to a hydraulic motor 135 provided with pressure fluid by a pump 137 coupled to the power take-off 134 of the vehicle.

Figure 9:
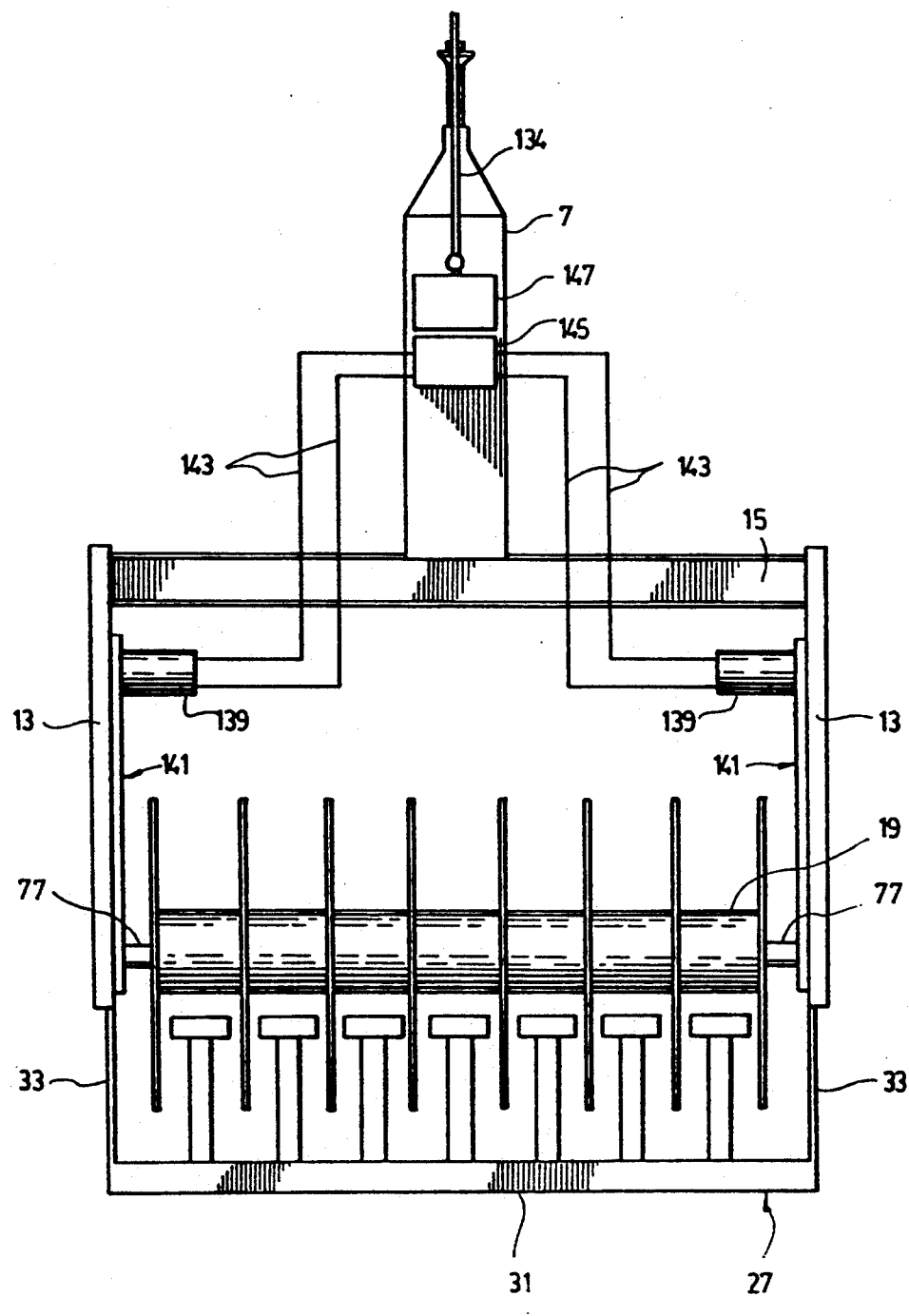
FIG. 9 is a diagrammatic top plan view of a second form of cultivator drive mechanism.
Figure 10:
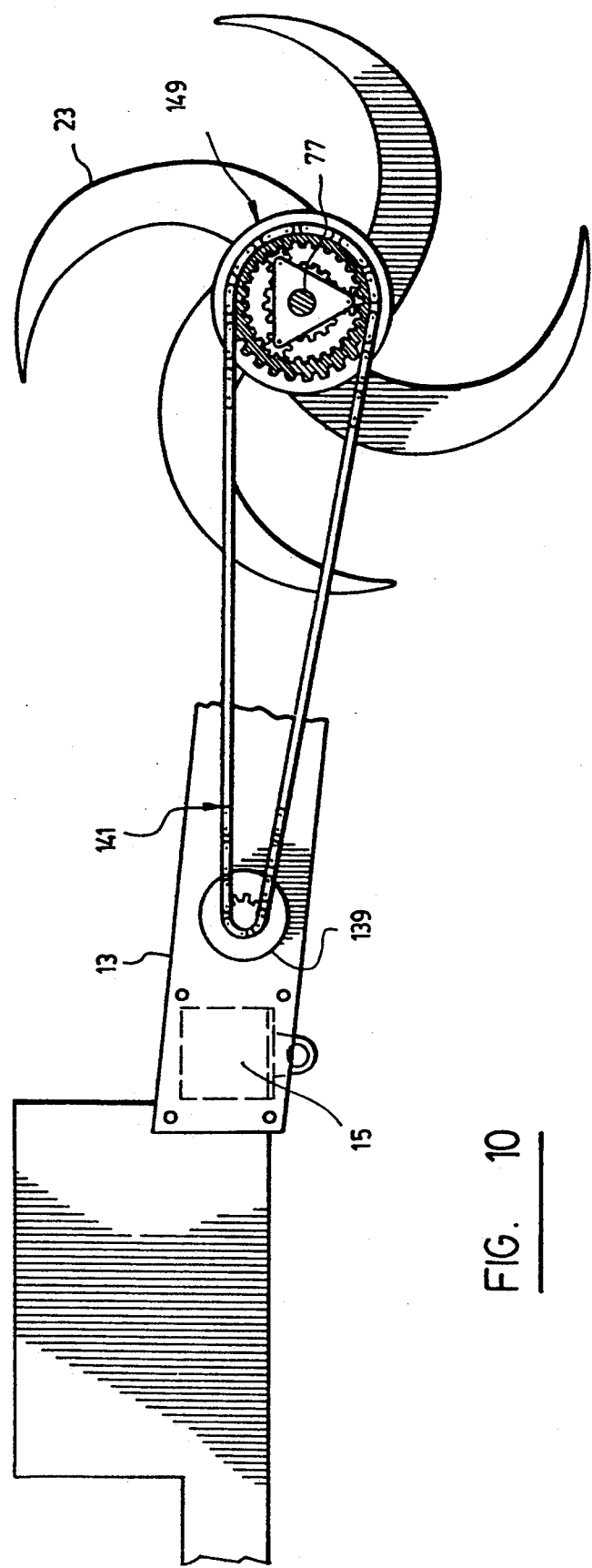
FIG. 10 is a diagrammatic side elevation view of the form of FIG. 9.
Figure 11:
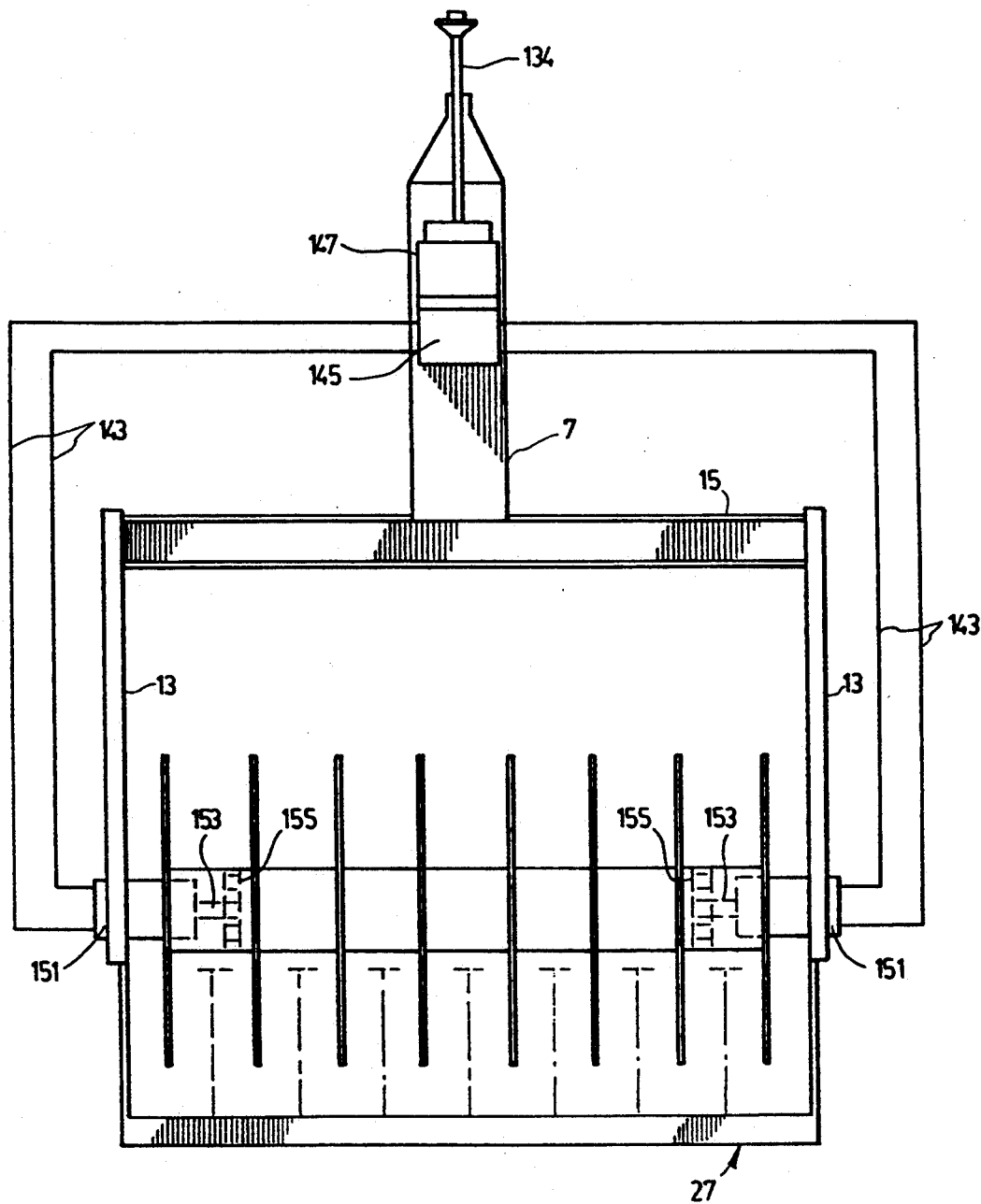
FIG. 11 is a diagrammatic top plan view of a third form of cultivator drive mechanism.

Other types of shaft drives are shown in FIGS. 9, 10 and 11 where the hollow shaft 19 may be in a single section and mounted for rotation (on the free ends of the lateral arms 13 of the cultivator frame 11 by the stub shafts 77.

In FIG. 9, the shaft drive comprises a pair of hydraulic motors 139 mounted on the lateral arms 13 and sprocket and chain connections 141 joining the motors 139 and the stub shafts 77 for rotating them. Power in the form of pressure fluid is fed to the motors 139 through pipings 143 from a hydraulic pump 145 driven by the power take-off 134 through a speed-increaser 147.

A similar arrangement is proposed in the variant of FIG. 10 where, however, the power is not transmitted directly from the motors 139 to the stub shafts 77 but through conventional speed-reducing planetary gear sets 149.

In FIGS. 11, on the other hand, a pair of like low speed high torque hydraulic motors 151 are provided at the free ends of the lateral arms 13, having their output shafts 153 facing inward of the frame arms 13 and coaxial and projecting inside the hollow shaft 19 to be made solid with it by any convenient connection means 155. As in FIG. 9, motors 151 are fed with pressure oil from pump 145 through pipings 143; the pump 145 being hooked to the power take-off 134 through the speed-increaser 147.

In the shaft drives of FIGS. 9 and 10, it will be appreciated that the shaft 19 need not be hollow but may be solid so that its ends act as the stub shafts 77. Alternatives of this type are shown in FIGS. 17, 18 and 19.

Figure 17:
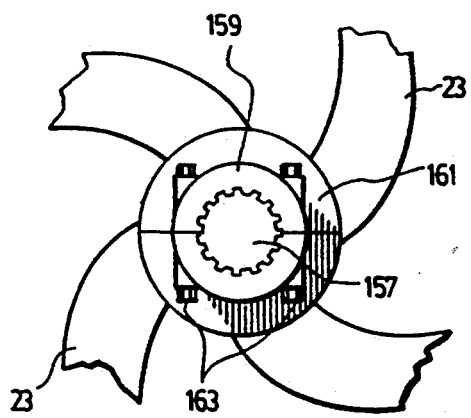
FIG. 17 is a cross-sectional view of an alternative form of assembly for mounting a rotary share on a drive shaft.
Figure 18:
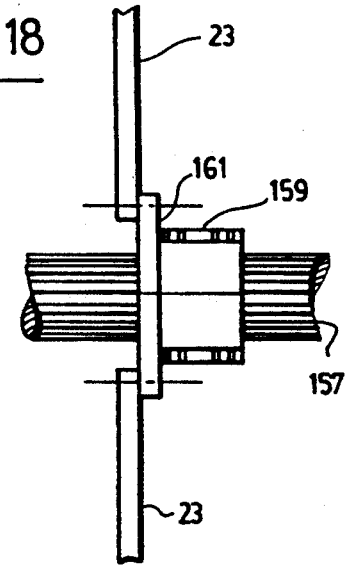
FIG. 18 is a side elevation view of the assembly of FIG. 17.

In FIGS. 17 and 18, the shaft 157 is a splined shaft over which are secured a series of spaced collars 159, each having a radial flange 161. As shown, each collar 159 is formed of two half-cylindrical parts; each part having a radial flange and inner keys engaging in the splines of the shaft 157 and clampingly locked on it by nuts and bolts 163.

Mounting of the chiselling blades 23 around each collar flange 161 may be by bolting the blade connection base 165, in the manner shown in FIG. 12, which also applies to the sleeves 69 of the hollow shaft 19 of FIG. 4. In both cases, as illustrated, each base 165 is releasably secured by the bolts 163 (73 in FIG. 4) at two selected points of two pairs of points on the relevant flange 161 (71); the pairs of points being located, radially, one above the other. This advantageously provides the possibility of varying the tilt angle of the chiselling blades.

Figure 19:
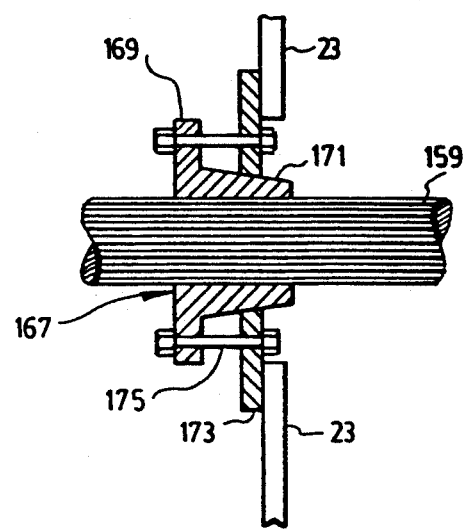
FIG. 19 is another form of the assembly of FIGS. 17 and 18.

In FIG. 19, the cylindrical collars 167 are made in a single piece and each collar has a radial flange 169 and inner keys that engage with the splined shaft 159 so that the collar can be non-rotatably slid along it. Each collar further has a frusto-conical circumferential surface 171 dropping from the radial flange 169. A ring 173, having bevelled bore corresponding to the inclination of surface 171, rests flatly on the latter and is forceably driven toward the flange 169 by bolts 175 so as to lockingly clamp the collar on the shaft. The chiselling blades 23 are secured by their connection base to the ring 173 in the same manner as in FIG. 12.

I claim:
1. A plow constructed for movement in a predetermined direction, said plow comprising:
   (a) a cultivator comprising:
       a generally U-shaped frame having a pair of laterally spaced arms extending parallel to said predetermined direction, said arms being interconnected by a bight;
       a draw centrally connected to said bight, said draw bar extending opposite said arms, and
       a soil-chiselling assembly mounted on and transversely between said arms at the free ends thereof, said assembly including
       a shaft provided with longitudinally spaced-apart sets of coplanar chisel-shaped blades extending flat in planes perpendicular to said shaft and each having a free end, means for mounting the ends of said shaft on said arms for free rotation of said shaft about an axis transverse to said predetermined direction;

at least one low speed, high torque hydraulic motor mounted on one of said arms of said cultivator, said at least one motor having an output shaft coaxial with, and operatively connected to said shaft;

a hydraulic pump mounted on said frame and operatively connected to said at least one hydraulic motor in order to supply pressurized fluid thereto and thereby drive said at least one motor, and means to operate said hydraulic pump, (b) a pair of wheels and means mounting said wheels on said frame for movement and adjustment thereof between a first position wherein said wheels engage the soil for displacement of said cultivator with said soil chiselling assembly standing inoperative above the soil, and a second position wherein said wheels are retracted and stand above the soil and the chisel-shaped blades of said soil-chiselling assembly deeply engage the soil, and;

(c) a lump breaker mounted on the free ends of said arms of said cultivator, said breaker including lump-breaking elements disposed between said spaced sets of chisel-shaped blades.

2. A plow as claimed in claim 1, wherein said wheels are disposed between said bight and said soil-chiselling assembly, and wherein said lump breaker is disposed on a side of said soil-chiselling assembly away from said bight.

3. A plow as claimed in claim 2, wherein said lump breaker comprises a generally U-shaped frame having a transverse support and laterally spaced legs, said lump-breaking elements being mounted on said support and extending in said predetermined direction toward said soil-chiselling assembly; and wherein said plow further comprises:

means mounting the free ends of said legs on the free ends of said arms of said cultivator frame for pivoted movement of said lump breaker about an axis transverse to said predetermined direction; and means for adjusting the angular position of said lump breaker frame relative to said cultivator frame.

4. A plow as claimed in claim 3, wherein each of said lump-breaking elements is an upwardly arcuate blade having one end resiliently pressed toward said support and being provided, at the other end, with a flat horizontal cross-foot extending on either side thereof.

5. A plow as claimed in claim 3, wherein each of said lump-breaking elements is an upwardly arcuate resilient blade having one end secured to said support and being provided, at the other end, with a flat horizontal cross-foot extending on either side thereof.

6. A plow as claimed in claim 2, wherein each of said lump-breaking elements is an upright plate having one end rigidly secured to said support and another end provided with a flat horizontal cross-foot extending on either side thereof.

7. A plow as claimed in claim 3, wherein said wheel mounting means comprise, for each wheel:

a bar at one end of which said wheel is mounted for free rotation;

means mounting the other end of said bar on said bight for pivotal movement of said bar and wheel about an axis transverse to said predetermined direction; and a power jack connected to said bar, adjacent to said wheel, and to said bight for pivoting said bar and said wheel thereon.

8. A plow as claimed in claim 2, wherein said lump breaker comprises a generally U-shaped frame having a transverse support and lateral legs, said lump-breaking elements being mounted on said support and extending in said predetermined direction toward said soil-chiselling assembly; wherein said plow further comprises:

means mounting the free ends of said legs on the free ends of said lateral arms of said cultivator frame for pivotal movement of said lump breaker about an axis transverse to said direction; and wherein said wheel-mounting means comprise:

a pair of bars coplanar and solid respectively with said lateral legs at the pivoted ends thereof, said bars and legs forming together upwardly open bell-crank levers, and wherein said wheels are mounted for free rotation at the free ends of said bars, respectively; and power jacks connected respectively to said bars, adjacent said wheels, and to the free ends of said lateral arms of said cultivator frame.

9. A plow as claimed in claim 3, wherein said soil-chiselling assembly comprises:

a plurality of horizontally disposed coaxial cylindrical sleeves;

means releasable securing said sleeves together end-to-end to form said shaft as a hollow shaft; and means removably securing said blades to and around said hollow shaft to project radially therefrom.

10. A plow as claimed in claim 9, wherein said blades are outwardly pointed arcuate blades.

11. A plow as claimed in claim 3, wherein said soil-chiselling assembly further comprises:

means releasably securing said blades to and around said shaft to project radially therefrom.

12. A plow as claimed in claim 3, wherein said soil-chiselling assembly further comprises:

a hollow sleeve forming said shaft as a hollow shaft; and means removably securing said blades to and around said hollow shaft to project radially therefrom;

and wherein said plow further comprises means within said hollow shaft to secure said hollow shaft and said output shaft of said at least one powered motor together.

13. A plow as claimed in claim 11, wherein each one of said blades has a connection base and wherein said means releasably securing said blades on said shaft comprise:

radial flanges spacedly provided on and along said shaft;

bolt means releasably securing the bases of each of said chiselling blades at two selected points of two pairs of points on one of said flanges for varying the tilt angle of the blades.

14. A plow as claimed in claim 11, wherein each one of said blades has a connection base; wherein said shaft is a splined shaft and wherein said means releasably securing said blades on said shaft comprise:

half-cylindrical collars each collar having a radial flange and inner keys cooperating with said splined shaft for locking said collar, in pairs, spacedly along said shaft;

bolt means lockingly clamping said collars together in said pairs, over said shaft; and means securing said blades by the bases thereof, on said radial flanges, to radiate therefrom.

15. A plow as claimed in claim 11, wherein each one of said blades has a connection base; wherein said shaft is a splined shaft and wherein said means releasably securing said blades on said shaft comprise:

cylindrical collars each having a radial flange and inner keys engageable with said splined shaft for non-rotatable sliding motion along said shaft, said collars each further having a frusto-conical circumferential surface dropping from said radial flange;

rings having bevelled bores resting flatly on said frusto-conical surfaces of said collars;

bolts means driving said rings toward said radial flanges for lockingly clamping said collars on said shaft; and means securing said blades by the bases thereof, on said radial flanges to radiate therefrom.

16. A plow as claimed in claim 11, wherein said blades are outwardly pointed arcuate blades.

17. A plow as claimed in claim 3, comprising two of said hydraulic motors operatively connected to said hydraulic pump, each one of said motors being mounted on one of said arms and having its output shaft secured to said shaft for rotating said shaft.

18. A plow as claimed in claim 3, wherein said means to operate said hydraulic pump comprises a speed-increaser hookable to a power take-off of a tractor.

* * * * *